Nov. 30, 1965 J. G. LUKER 3,220,719
EXPANSIBLE MANDREL
Filed May 2, 1962 4 Sheets-Sheet 1
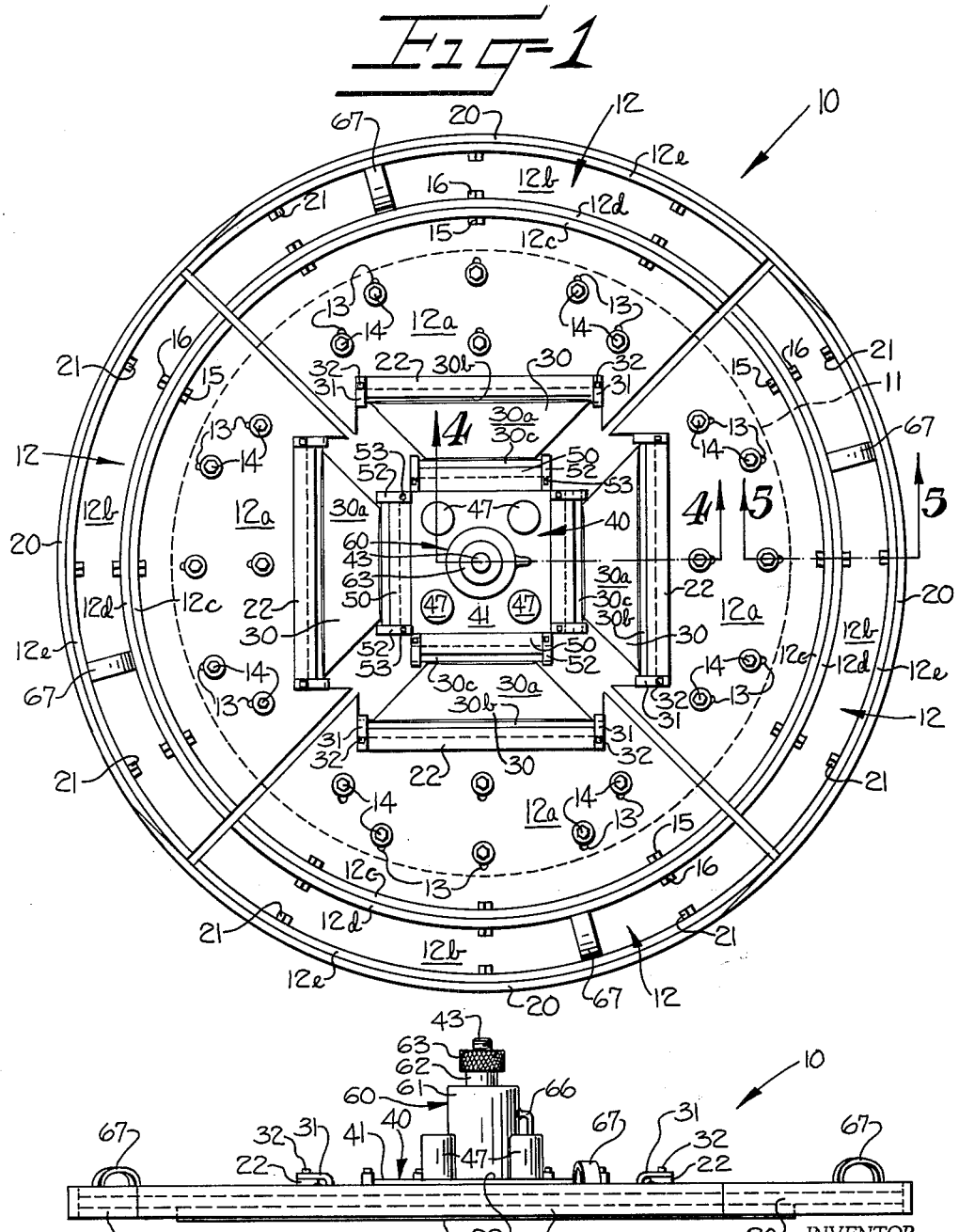
INVENTOR.
JOHN G. LUKER
BY
Eaton, Bell, Hunt & Selliger
ATTORNEYS Nov. 30, 1965  J. G. LUKER  3,220,719
EXPANSIBLE MANDREL
Filed May 2, 1962  4 Sheets-Sheet 2
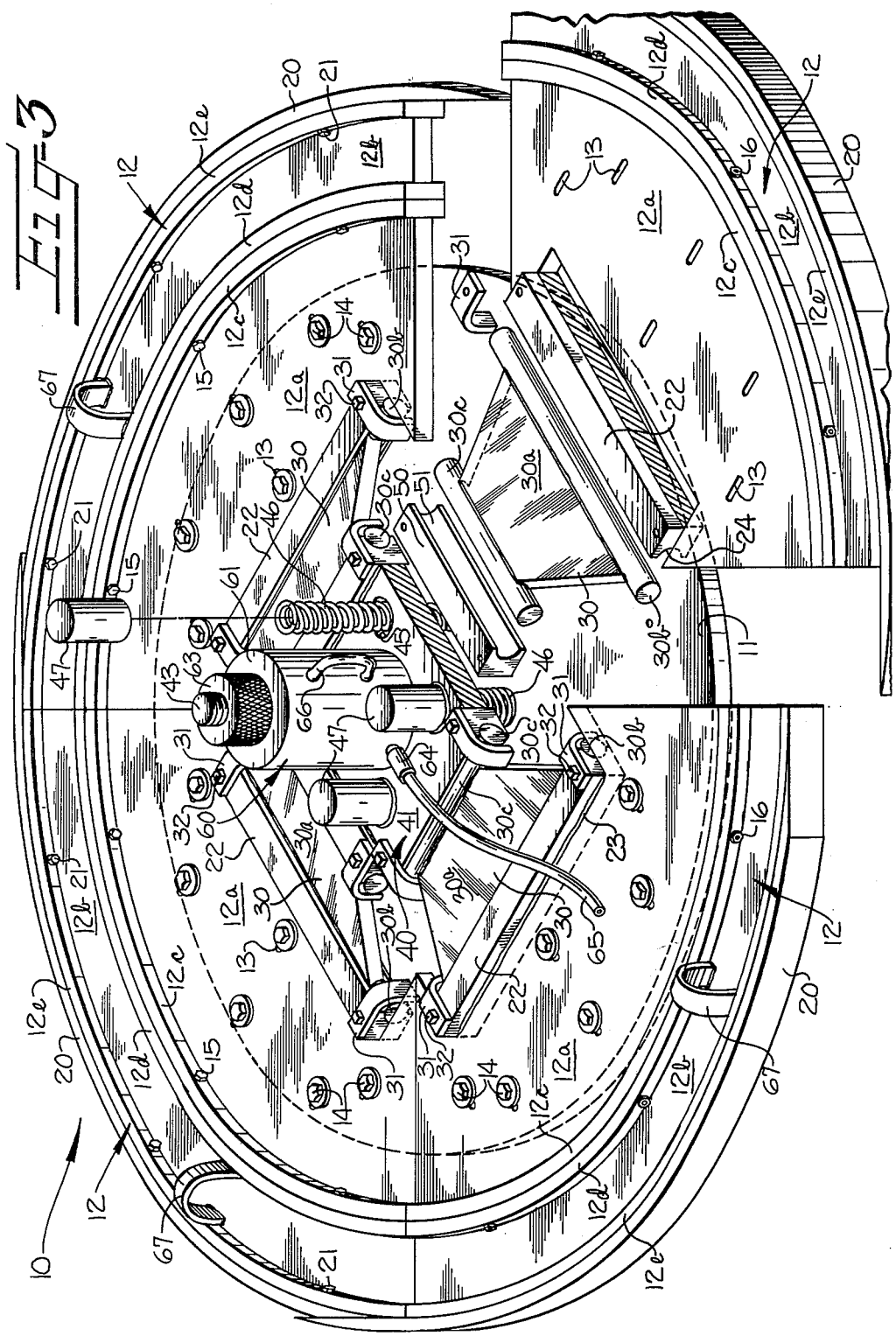

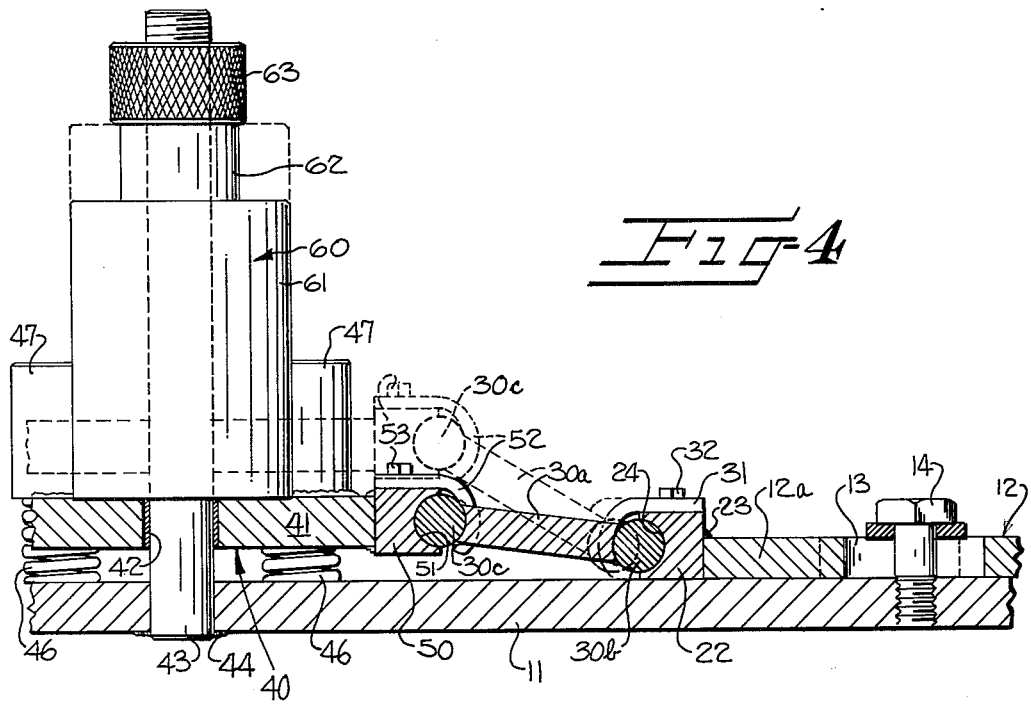
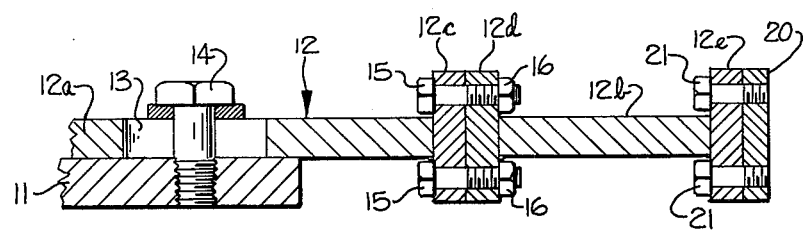
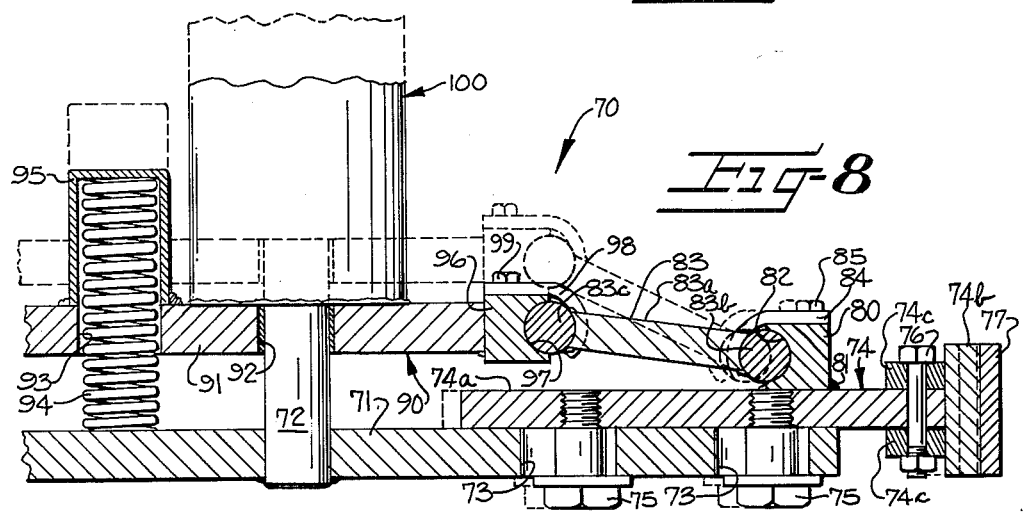

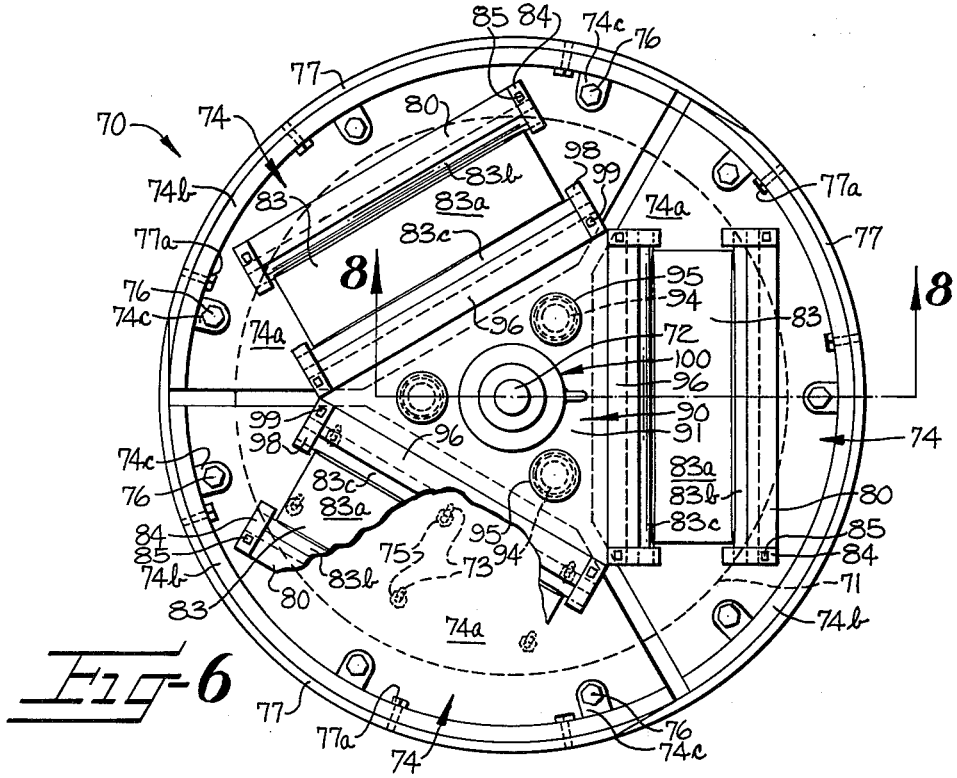
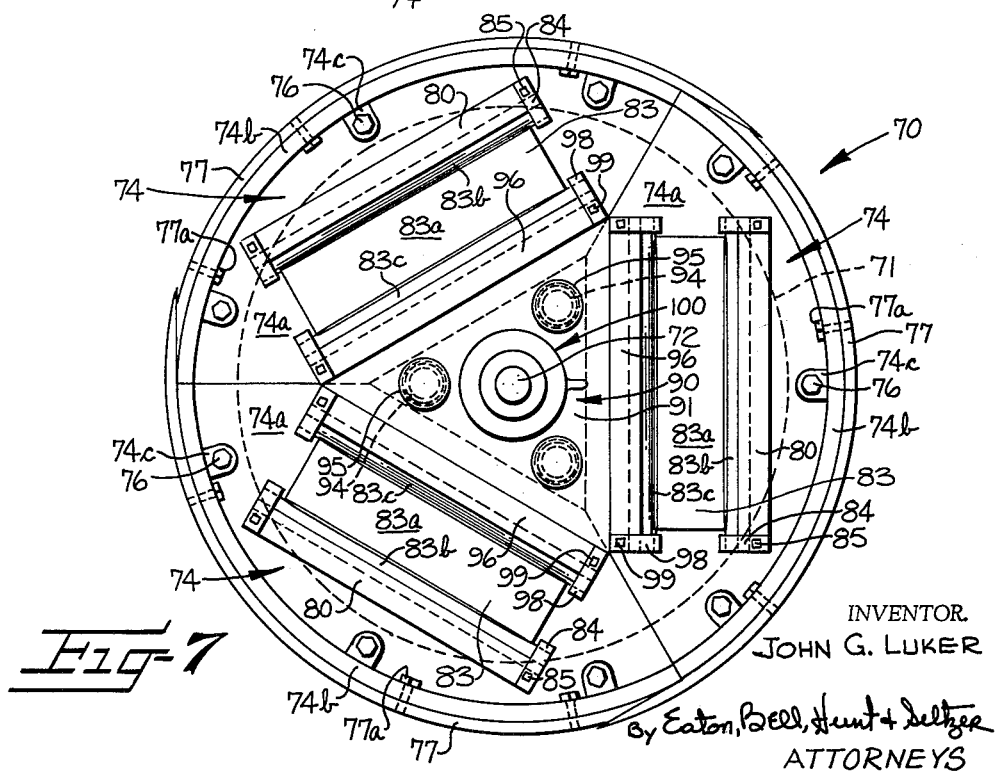

United States Patent Office 3,220,719
Patented Nov. 30, 1965

3,220,719
EXPANSIBLE MANDREL
John G. Luker, Stanley, N.C.
Filed May 2, 1962, Ser. No. 191,906
10 Claims. (Cl. 269—48.1)

The present invention relates to mandrels and more particularly to expansible mandrels adapted to be used in connection with the manufacture of tubular members.

In the manufacture of tubular members such as cylindrical tanks, kiers, pipe sections and the like, it is normal practice to form each of the sections of the tanks, kiers, etc., from a sheet of metal by bending the same into a tubular configuration and welding the abutting ends of the sheet together. When two of the thusly formed tubular sections are to be used to form a tank, kier, etc., or the end caps are to be connected to the tubular section or sections, the adjacent ends thereof are placed in abutting relation and these ends are secured together by a welded joint extending circumferentially around the tubular sections.

Quite often, the different sections to be connected together or the tubular section and end caps, are of slightly different diameters or are "out of round" or not of a circular configuration such that considerable difficulty is encountered in bringing the abutting ends thereof into alinement. The sheets of metal from which the tubular sections are formed sometimes have irregularities in the surface in the nature of depressions or humps. These irregularities are highly undesirable in the tanks, kiers, etc. which are formed from the tubular sections and the removal of these irregularities heretofore has been a serious problem in the manufacture of these products. Since the metal, for example stainless steel and the like, usually used in the manufacture of tanks, kiers, etc., has high strength characteristics, the aforementioned problem is particularly acute in the manufacture of relatively large tanks, kiers, etc., in which the thickness of the metal is appreciable. It can readily be appreciated that a very large outward force or pressure must be exerted on the tubular sections to remove the aforementioned irregularities, to stretch a tubular section from a slightly reduced diameter to the desired diameter, or to form an "out of round" tubular section into a circular configuration.

Also, when the welded joint is formed to connect two tubular sections together, the metal of the weldment sometimes flows between the abutting ends of the sections and forms a rough seam around the interior of the connected tubular sections at the welded joint. This rough seam is highly undesirable since it is usually imperative that the interior or the tanks, kiers, etc., be smooth and uninterrupted.

Another problem which has heretofore been encountered in the manufacture of these products resides in the formation of weak spots due to the uneven dissipation of heat from the weldment during formation thereof. Also, the metal of the weldment and the adjacent portions of the tubular sections contract as the welded joint cools and this results in an area of reduced diameter or a circumferentially extending rib on the interior surface of the sections at the welded joint. Such a rib or a constricted area is highly undesirable for numerous reasons since, as stated above, it is usually imperative that the interior surface be smooth and uninterrupted and that the tank or kier be of the same diameter throughout.

Conventional mandrels which are presently available are effective as back up means for welded joints to insure that the metal will not flow between the abutting ends of the tubular sections and cause a rough seam on the interior surface thereof. However, all of the conventional mandrels with which applicant is familiar do not effectively cure the other aforementioned problems encountered due to their inability to exert the very large forces required to remove the aforementioned irregularities or to stretch an "out of round" tubular section into a circular cross-sectional configuration, and since they are not capable of resisting the contracting force exerted thereon by a cooling weldment. In this regard, the majority of conventional mandrels have a movable hub connected to a plurality of sectors by a plurality of elongate links which are connected at their opposite ends to the hub and the sectors by pins. Usually, these pins penetrate through a single lug formed on each of the links and a pair of lugs formed on the hub or sector or vice versa which straddle the single lug. In this type connection, all of the force to be transmitted to the links from the hub is applied to the pins as a shearing load and, therefore, the maximum force which may be exerted or withstood by these mandrels is only a force equal to the shear yield strength of the pins. Also, the diameter of the pins is usually considerably less than the thickness of the links and sectors and hence, the bearing surfaces between the hub and the pins; between the pins and links; and between the pins and the sectors are not only short and discontinuous but also constitute only a very small area of these elements. Therefore, even if the pins are formed of sufficient shear resistance to withstand the very large forces applied thereto the links and/or hub and/or sectors quite often fail in compression at the small bearing surfaces.

At least one attempt, Grotnes Patent No. 1,456,734, has been made to overcome the shear problems in the aforementioned conventional mandrels by providing bearing surfaces on the hub and sectors on opposite sides of the pins from the bearing surfaces on the links. However, this bearing surface is also of a diameter considerably less than the thickness of the links, hub and sectors, in this case the bearing surface is equal only to approximately one half of the thickness of the links and, while the shear problem is obviated to some extent, the other problem of failure in compression of the small bearing surfaces on the hub and/or links and/or sectors is still present.

Since the force required to move the sectors to the expanded position is applied thereto within the aforementioned small bearing surfaces, and since the tubular sections apply resistance to stretching or the contracting forces over the entire outer periphery of the sectors, a substantial portion of each of the sectors of these conventional mandrels is being subjected to full bending load with substantially none of the bending load being off-set by the force applied to the sectors by the links. Therefore, the outer portions of the sectors of these conventional mandrels are very susceptible to deflection under this bending load which results in uneven stretching of the metal or uneven resistance to contraction resulting in an undesirable uneven interior surface, even if the remainder of the apparatus is capable of exerting the force required to perform the stretching or to resist the contraction. Also, deflection of any portion of the sectors would result in weak places in the weldment of the joint due to uneven heat dissipation.

The present invention obviates the aforementioned problems by providing a mandrel wherein the sectors and force transmitting linkage members between the hub and the sectors are constructed so that all of the force transmitted through the members is compressive force with substantially no shearing force being applied to any part thereof. Also, the bearing surfaces between the hub and the force transmitting members and between these members and the sectors are of a diameter at least as great as the thickness of the force transmitting members, the hub and the sectors. Also, these bearing surfaces are continuous and of such length relative to the chord length of the periphery of the sectors such that a major portion of each of the sectors is subjected to compressive force so that the bending load applied to this major portion is substantially off-set by this compressive force. Therefore, the sectors and linkage may be made of materials of considerable less mass than conventional mandrels while withstanding greater loads and exerting larger forces without failure of deflection.

It is therefore an object of the present invention to provide an improved expansible mandrel for use in connection with the manufacture of tubular members such as tanks, kiers, etc., wherein a major portion of each of the sectors is subjected to compressive force which substantially off-sets the bending loads applied thereto so that the desired large force may be exerted or resisted thereby without failure or appreciable deflection.

Another object of the present invention is to provide an expansible mandrel having a plurality of radially movable sectors, force applying means and force transmitting members connecting said force applying means and said sectors to move said sectors radially outwardly relative to each other, wherein the force transmitting members have bearing contact with the force applying means and the sectors and wherein this contact is along arcuate continuous bearing surfaces having a diameter at least as great as the thickness of the force transmitting members.

A more specific object of the present invention is to provide an expansible mandrel of the character last described wherein the bearing surfaces are of such length relative to the chord length of the outer periphery of the sectors so that a major portion of each of the sectors is subjected to compressive force to substantially off-set the bending load applied thereto.

Another object of the present invention is to provide an expansible mandrel which is capable of exerting outward pressure of great magnitude on the interior surface of a tubular member to serve as back up means for a welded joint therein to form a smooth surface on the interior of the joint and to off-set the contaracting forces encountered in the cooling of the joint and which is also usable to stretch an "out of round" tubular section into the desired circular configuration and to remove irregularities from the interior surface of the metal forming the sections, wherein a major portion of each of the sectors thereof is under compressive load which off-sets the majority of the bending load applied to the sectors so that the sectors may be formed of reduced mass while still exerting or resisting the large forces without failure or appreciable deflection.

Some of the objects of the invention having been stated, other objects will appear as the description proceeds, when taken in connection with the accompanying drawings, in which FIGURE 1 is a plan view of a first embodiment of the present invention;

FIGURE 2 is an elevational view of the mandrel shown in FIGURE 1;

FIGURE 3 is an enlarged isometric view of the apparatus shown in FIGURE 1 with portions broken away and with parts shown in exploded position;

FIGURE 4 is an enlarged fragmentary sectional view taken substantially along line 4—4 in FIGURE 1;

FIGURE 5 is an enlarged fragmentary sectional view taken substantially along line 5—5 in FIGURE 1;

FIGURE 6 is a plan view of another embodiment of the present invention with the sectors shown in expanded position;

FIGURE 7 is a view similar to FIGURE 6 with the sectors shown in retracted position; and FIGURE 8 is an enlarged fragmentary transverse sectional view taken substantially along line 8—8 in FIGURE 6.

Referring now to the drawings and more particularly to FIGURES 1–5, the mandrel of the present invention is generally indicated at 10. Mandrel 10 comprises a flat, circular plate-like base 11 which is of sufficient thickness to support the remaining elements of mandrel 10. A plurality of sectors 12, preferably four in number and which combine to define a circular configuration in plan, are provided with a plurality of elongate openings 13 which receive bolts 14 therethrough. Bolts 14 are matingly received in suitable internally threaded openings in base 11 (FIGURE 4). It is noted that elongate openings 13 allow sectors 12 to move relative to base 11 between a retracted position and an expanded position.

Each of the sectors 12 comprises an inner portion 12a, which is the portion of sector 12 mounted on base 11, and an outer ring portion 12b which is mounted on inner portion 12a for movement therewith relative to base 11. In this regard, inner portion 12a has a flange member 12c (FIGURE 5) mounted on the outer peripheral edge thereof by any suitable means such as welding and which extends upwardly and downwardly from portion 12a. Outer ring portion 12b has a similar flange member 12d mounted on its inner edge. Flange members 12c and 12d have alined openings formed therein which receive bolts 15 having head portions at one end and suitable nuts 16 threadably received on the other end for releasably mounting the outer ring portion 12b on the inner portion 12a. Outer ring portion 12b also has a flange member 12e, similar to flange members 12c and 12d, mounted on its outer peripheral edge. While the above described structure of sectors 12 is preferred, it should be understood that each sector may be formed in one piece, as is the case in the embodiment shown in FIGURES 6–8, to thereby dispense with the separate inner and outer portions without departing from the spirit of the present invention. Also, it is contemplated that the flange 12c could be formed integral with outer ring portion 12b.

An outer rim 20 is mounted on flange 12e of outer ring portion 12b by suitable bolts 21 extending through holes formed in flange 12e and into internally threaded holes formed in rim 20. Rim 20 is preferably formed of a suitable heat dissipating material such as copper or the like. Outer rim 20 on each of the sectors 12 has the outer surface of one end portion cut away along a line which is tangential to the corner of the adjacent sector 12 as is clearly indicated in FIGURE 1. The other end portion of each outer rim 20 has the inner surface cut away along a line tangential to the corner of the sector 12 on which rim 20 is mounted so that when the sectors are in the expanded position the outer surface of said one end portion of one of the rims 20 will engage the inner surface of the adjacent end portion of another rim 20 on the adjacent sector to provide a substantially continuous outer peripheral surface for contact with the interior of a tubular member.

Each of the sectors 12 has an elongate bearing block 22 mounted on the inner edge of inner portion 12a thereof by any suitable means such as welding 23. It is noted that bearing block 22 may be formed integral with the inner edge of inner portion 12a. The side of bearing block 22 opposite from the inner edge of sector 12 is provided with a substantially semi-circular elongate recess 24 extending longitudinally for substantially the full length of bearing block 22.

An elongate force transmitting member 30 includes a web portion 30a, a first bearing portion 30b at one side thereof and a second bearing portion 30c at the other side thereof. Web portion 30a is preferably of a trapezoidal shape with the ends thereof disposed at 45° relative to the sides for reasons to be presently described. It is contemplated, however, that web portion 30a may be rectangular in plan. Bearing portions 30b and 30c preferably comprise circular rods which are mounted in suitable arcuate recesses formed in opposite sides of web portion 30a, which recesses conform substantially to the outer configuration of bearing portions 30b, 30c by suitable means such as welding. Bearing portion 30b has the surface thereof opposite from web portion 30a positioned within arcuate recess 24 which is preferably of a radius of curvature equal to the radius of bearing portion 30b.

It is noted that bearing portions 30b and 30c are of a diameter at least as great as the thickness of web portion 30a so that all of the cross-sectional area of web portion 30a will be in engagement with bearing portions 30b and 30c and will be utilized to apply force thereto or receive force therefrom so that the bearing surfaces between web portion 30a and bearing portions 30b and 30c will have a compressive yield strength at least as great as the remainder of web portion 30a. Preferably, bearing portions 30b and 30c are of a larger diameter than the thickness of web portion 30a so that force transmitting members 30 may more readily pivot relative to bearing blocks 22 and hence, sectors 12 while under very large compressive forces.

Bearing portions 30b and 30c have opposite end portions thereof extending outwardly from opposite ends of web portion 30a. A pair of straps or connecting brackets 31 are mounted at one end on bearing block 22 by suitable bolts 32 and extend outwardly and downwardly into at least partial surrounding relation to the end portions of bearing portion 30b to maintain bearing portion 30b within recess 24 and to connect force transmitting member 30 to bearing block 22 and hence, to sector 12.

It is noted that compressive forces applied to a member which is larger than the area over which the forces are applied will radiate outwardly from this area at angles up to 45°. Therefore, the portion of each of the sectors 12 which is under compressive force is defined by lines drawn from opposite ends of bearing blocks 22 to the outer periphery of sectors 12 at 45° relative to the longitudinal centerline of bearing blocks 22. Preferably, bearing blocks 22 and hence, bearing portions 30b are of a length substantially greater than one-half of the length of the inner edges of sectors 12 so that a major portion of each of the sectors 12 is under compressive forces. Since the portions of sectors 12 defined by the sides thereof and lines drawn from opposite ends of bearing blocks 22 to the outer periphery of sectors 12 perpendicular to the longitudinal centerline of bearing blocks 22 are under bending loads from the resistance to stretching or contracting forces exerted thereon by the tubular members, the compressive forces exerted on sectors 12 substantially off-sets the bending loads in the aforementioned major portion thereof. Therefore, in the embodiment shown in FIGURES 1–5, only a very minor portion of each of the sectors 12 is subjected to full bending loads and, hence, sectors 12 may be made of considerably less mass than has heretofore been possible while exerting or withstanding greater forces or loads without failure or appreciable deflection. In this regard, the bending loads on the aforementioned minor portions of each of the sectors 12, in the embodiment shown in FIGURES 1–5, are less than would be present in conventional mandrels since the moment arm of the bending forces applied has been considerably shortened by the above described structure.

Since compressive forces will radiate in the aforementioned manner, the trapezoidal shape of force transmitting members 30 permits a longer bearing portion 30b than would be possible with a rectangular force transmitting member while still having all of the force transmitting members under compressive forces. This structure permits the maximum length of force transmitting member to be used in the space defined by the inner edges of sectors 12.

A force applying means for moving sectors 12 between the retracted and the expanded positions is generally indicated at 40 and comprises a hub member 41 which has an opening formed substantially centrally thereof in which is disposed a suitable bearing 42. An upstanding post or standard 43 is fixedly mounted at its lower end on base 11 by any suitable means such as welding 44 and extends upwardly therefrom and through bearing 42 to a point above hub 41 where it terminates in an externally threaded free end portion. Hub 41 is thereby mounted for vertical movement relative to base 11 between an upper position wherein sectors 12 would be in retracted position and a lower position in which sectors 12 would be in extended position.

Hub 41 also has a plurality of openings 45 formed therein in which are disposed a plurality of compression springs 46 which have the lower end thereof resting on base 11. The upper end portion of each of the springs 46 is disposed within an open bottom, closed top, canister type member 47 which has the open lower end thereof fixedly mounted on hub 41 by any suitable means such as welding in alinement with one of the openings 45. Springs 46 therefore bias hub 41 to the upper position.

Hub 41 has a bearing block 50 mounted on each of the four sides thereof by any suitable means such as welding with one side thereof in abutting relation with the corresponding side of hub 41. Bearing blocks 50 may be formed integral with hub 41 if desired. The other side of each of the bearing blocks 50 has a substantially semi-circular elongate recess 51 in which bearing portion 30c of force transmitting member 30 is normally disposed. Opposite ends of bearing portion 30c are connected to bearing block 50 by a pair of straps of connecting brackets 52 which are substantially identical to connecting brackets 31. Connecting brackets 52 are mounted on bearing block 50 by suitable bolts 53 and serve to retain bearing portion 30c in recess 51.

A hydraulic jack 60 has a central opening extending therethrough which penetratingly receives standard 43 and one end of jack 60 rests on the upper surface of hub 41. Hydraulic jack 60 comprises an outer cylinder 61 which surrounds and houses a suitable piston (not shown) which is connected or formed integrally with one end of piston or connecting rod 62. Piston rod 62 is mounted for sliding movement relative to cylinder 61 and would normally be movable between a retracted position and an extended position. However, a nut 63 is threadedly mounted on the externally threaded upper end of standard 43 in abutting relation to the other end of piston rod 62. It is noted that nut 63 prevents upward movement of piston rod 62 and therefore, when hydraulic fluid is admitted to hydraulic jack 60, cylinder 61 will move downwardly. Since cylinder 61 is resting on the upper surface of hub 41, hub 41 will be moved downwardly thereby against the action of compression springs 46.

Hydraulic jack 60 has an inlet pipe 64 communicating with the interior of cylinder 61 below the piston connected to the inner end of piston rod 62. A suitable flexible hose 65 is communicatively connected to inlet pipe 64 at one end and to a suitable hydraulic source (not shown) at its other end for supplying hydraulic fluid to hydraulic jack 60. A suitable handle 66 is provided on the hydraulic jack 60 for ease in handling thereof when the same is removed from standard 43.

Each of the sectors 12 has a bracket 67 mounted thereon for connection to a suitable lifting mechanism for handling of mandrel 10 for positioning the same within the tubular members. Also, if desired, a suitable member may be threadedly mounted on standard 43 for this same purpose. The hanger brackets 67 may also be used to lift the individual sectors from a tubular member when mandrel 10 is disassembled within the tubular member and removed piece by piece. While four sectors 12 are preferred, it should be understood that sectors 12 may be of any number in excess of two without departing from the spirit of the present invention. In this regard, as the number of sectors 12 varies, the number of force transmitting members 30 will also vary, as will the number of sides on hub 41.

In operation, the sectors 12 of mandrel 10 are normally held in the retracted position by springs 46 biasing hub 41 upwardly. When any of the aforementioned operations are desired to be effected on a tubular member, mandrel 10 is suitably positioned within the tubular member at the desired location. With the mandrel in this position, hydraulic fluid under pressure is supplied to hydraulic jack 60 by flexible line 65 and inlet pipe 64 from the hydraulic fluid source (not shown). The fluid enters cylinder 61 beneath the piston connected to the inner end of piston rod 62 and causes relative movement between cylinder 61 and piston rod 62. Since piston rod 62 is restrained against upward movement by nut 63 mounted on standard 43, cylinder 61 is forced downwardly and the lower end thereof exerts a downward force on hub 41 which causes downward movement thereof against the action of compression springs 46. It is noted that the relatively large area of the lower end of cylinder 61 insures that a considerable portion or area of hub member 41 will be under force from cylinder 61 so that this force is spread over a larger area than would be the case if piston rod 62 were used to apply force to hub member 41. This considerably reduces the bending load applied to any unit area of hub 41.

As hub member 41 moves downwardly, force transmitting members 30 are pivoted downwardly with bearing portions 30b rotating in recesses 24 in bearing blocks 22 from the position shown in dotted lines in FIGURE 4 to the position shown in solid lines therein. To effect this movement, bearing blocks 50 apply a downward force on bearing portions 30c throughout the length thereof which force is transmitted to web portions 30a of force transmitting members 30. Since compressive force will radiate in the manner set forth above, the force applied to web portion 30a is applied thereby to bearing portion 30b for the full length of the portion of bearing portion 30b in engagement with web portion 30a. Bearing portions 30b transmit the force from web portion 30a to bearing blocks 22 which in turn transmit the force to the inner portion of sector 12. Sector 12 is thereby moved outwardly relative to base 11 into engagement with the interior surface of the tubular member. When sectors 12 are in the expanded position, outer rims 20 have the corresponding end portions in cooperating overlapping relation as described above so that a substantially even and continuous periphery is provided for exerting a substantially even outward force on the interior of the tubular member.

When it is desired to move sectors 12 to the retracted position, hydraulic fluid is removed from hydraulic jack 60 through inlet pipe 64 and flexible line 65 and compression springs 46 move hub member 41 and cylinder 61 upwardly. Upward movement of hub 41 retracts sectors 12 inwardly by means of connecting brackets 52 and 31 and force transmitting members 30. It is noted that springs 46 are of sufficient resistance to compression to retract the sectors 12 to the fully retracted position.

Referring now to FIGURES 6–8 wherein a second embodiment of the mandrel of the present invention is shown, this mandrel is generally indicated at 70 and includes a base 71, similar to base 11. Base 71 has a substantially centrally disposed opening in which a standard 72, substantially identical to standard 43, is fixedly mounted. Base 71 also has a plurality of elongate openings 73 formed therein with the longitudinal axis thereof extending radially outwardly from the center opening. Three sectors 74 are mounted on base 71 for radial sliding movement by bolts 75 penetrating through elongate openings 73 and being matingly received in internally threaded openings formed in the inner, plate-like portion 74a of sectors 74.

Each of the sectors 74 has an outer flange 74b mounted on inner portion 74a by a plurality of upper and lower lugs 74c which are disposed on opposite sides of inner portion 74a and which have holes therein in alinement with suitable holes formed in the portion of sector 74 therebetween. A bolt 76 penetrates through these openings to releasably mount flange 74c on the outer edge of the inner portion 74a of sector 74. Sectors 74 also have outer rims 77 mounted on the outer surface of flanges 74b by bolts 77a penetrating through suitable openings formed in flanges 74b and being threadably received in internally threaded openings in outer rims 77.

As was the case in the previously described embodiment, outer rims 77 are preferably constructed of suitable heat dissipating material such as copper and have opposite ends formed in cooperating, overlapping relation. In this regard, one end of outer rims 77 has the outer surface thereof formed flat and tapered along a line tangential to the corners of the adjacent sector with the other end having the inner surface formed flat and tapered along a line tangential to the corner of the sector on which the rim is mounted. Therefore, rims 77 cooperate to provide a continuous outer periphery on the mandrel when the sectors are in expanded position.

Each of the sectors 74 has a bearing block 80 mounted on the top surface of inner portion 74a by any suitable means such as welding 81. Bearing block 80 is of a length greater than one-half the distance between the opposite outer corners or the chord length of the periphery of each of the sectors 74 so that a major portion of each sector is under compressive load. The opposite side of each of the bearing blocks 80 from the outer periphery of sectors 74 is provided with a substantially semi-circular recess 82 running for the full length thereof.

A force transmitting member 83, including a web portion 83a, an outer bearing portion 83b and an inner portion 83c, has outer bearing portion 83b disposed in recess 82 of each of the bearing blocks 80 and is connected thereto by connecting brackets 84 which are mounted on bearing blocks 80 by bolts 85. Connecting brackets 84 extend at least partially around the end portions of bearing portion 83b substantially in the same manner as connecting brackets 31 in the previously described embodiment. It is noted that the engaging surfaces of bearing portions 83b and recesses 82 define bearing surfaces between force transmitting members 83 and sectors 74 for the transmission of force therebetween.

Force applying means 90 which is substantially the same as force applying means 40 is mounted on standard 72 and includes a hub 91 which is triangular in plan. Hub 91 has a central opening 92 through which standard 72 loosely penetrates and three equally spaced openings 93 through which penetrate three springs 94. Inverted cylindrical members 95 house the upper end portions of springs 94 and are fixedly connected at their lower open ends to hub 91.

Hub 91 has a bearing block 96 mounted on each of the three sides thereof by any suitable means such as welding. Bearing blocks 96 are substantially the same as bearing blocks 50 and have a substantially semi-circular elongate recess 97 formed in the outside surface and extending for the full length thereof. Recesses 97 receive bearing portions 83c of force transmitting members 83 therein and are connected thereto by connecting brackets 98 which are mounted on bearing blocks 96 by bolts 99 and at least partially surround opposite end portions of bearing portions 83c. It is noted that the engaging surfaces of bearing portions 83c and recesses 97 define bearing surfaces between hub 91 and force transmitting members 83 for the transmission of force therebetween.

A hydraulic jack 100 is positioned on hub member 41 and corresponds in structure to hydraulic jack 60 of the previously described embodiment and therefore will not be redescribed in regard to this embodiment. It is to be understood, however, that any force applying means may be substituted for hydraulic jacks 60 or 100 commensurate with the forces required to be applied to achieve the necessary outward expansion of sectors 12 and 74 without departing from the spirit of the instant invention.

It is noted that mandrel 70 is normally considerably smaller than mandrel 10 and is preferably to be used in the manufacture of relatively small diameter tubular members in which the forces encountered would not be as large as in larger tubular members. Mandrel 10 is preferably of considerably greater diameter than mandrel 70 and is preferable where a very large outward expansive force is required. It is to be understood, however, that mandrels 10 and 70 are not limited to any specific size or mass and could be used interchangeably with suitable minor modifications in structural design all of which are contemplated within the present invention.

The operation of mandrel 70 is substantially identical to the operation of mandrel 10 and therefore this operation will not be repeated.

It will therefore be readily apparent that an improved expansible mandrel is provided having a plurality of sectors, force applying means and force transmitting members connecting the force applying means and the sectors, wherein uninterrupted bearing surfaces are provided between the force applying means and the force transmitting members and between these members and the sectors which are of such a length relative to the chord length of the periphery of the sectors so that a major portion of each sector is under compressive force so that the mandrel is capable of applying very large expansive forces and of resisting very large contracting forces without failure of appreciable deflection, and wherein a substantially continuous periphery is provided to engage the interior surface of a tubular member for applying a substantially even outward force on all portions thereof.

In the drawings and specification there has been set forth preferred embodiments of the invention and, although specific terms are employed, they are used in a generic and descriptive sense only, and not for purposes of limitation, the scope of the invention being defined in the claims:

I claim:

1. An expansible mandrel for use in connection with the manufacture of tubular members, said mandrel comprising
   (a) a base,
   (b) at least three sectors mounted on said base for sliding radial movement between a retracted position and an expanded position, said sectors having outer peripheries adapted to engage the interior surface of a tubular member when said sectors are in expanded position, each of said sectors having an elongate bearing surface thereon positioned inwardly from the periphery of said sectors and extending generally parallel to said base, said bearing surface having a length encompassing at least a major portion of the width of the sector taken along a line including the bearing surface,
   (c) a force transmitting member for each of said sectors and having a width substantially greater than the thickness thereof and having first and second elongate bearing surfaces on opposite ends thereof of lengths corresponding at least to the width of said force transmitting member along the corresponding ends thereof, said first bearing surface on each of said force transmitting members being disposed in coextensive complementary engagement with the bearing surface on the corresponding sector and defining therewith an axis about which said force transmitting member is oscillatory movable toward and away from said base, said second bearing surface on said transmitting member being of sufficient relative length to said first bearing surface thereon and said first bearing surface and said bearing surface on the corresponding sector being of sufficient relative length to the chord length of the periphery of the sector that a major portion of the sector is subjected to compressive load to substantially offset the bending loads thereon, and
   (d) force applying means having elongate bearing surfaces coextensively and complementarily engaging the second bearing surfaces on said force transmitting members for applying force thereto in a direction to move said force transmitting members toward said base and to move said sectors radially outwardly from the retracted position to the expanded position.

2. An expansible mandrel according to claim 1 wherein said complementary bearing surfaces on said sectors, force transmitting members and force applying means are arcuate in transverse cross-section and have a radius of curvature at least as great as one-half the thickness of said force transmitting members.

3. An expansible mandrel according to claim 1 wherein said force applying means includes a hub movable toward and away from said base, and having bearing surfaces engaging the second bearing surfaces on said force transmitting members, means connected to said hub for moving the same toward said base to exert a radial outward force on said sectors through said force tranmsitting members and for moving said hub away from said base, and including means connecting said hub and said sectors to said force transmitting members for movement of said sectors from the expanded position to the retracted position upon movement of said hub away from said base.

4. The structure recited in claim 1 wherein said bearing surfaces on said sectors are disposed substantially along the inner edges thereof.

5. The structure recited in claim 1 wherein said bearing surfaces on said sectors are defined by blocks mounted on the upper surface of said sectors intermediate the peripheries and inner edges thereof.

6. An expansible mandrel for use in connection with the manufacture of tubular members, said mandrel comprising
   (a) a base,
   (b) at least three sectors mounted on said base for sliding radial movement between a retracted position and an expanded position, said sectors having outer peripheries adapted to engage the interior surface of a tubular member when said sectors are in expanded position, each of said sectors having an elongate bearing surface thereon positioned inwardly from the periphery of said sectors and extending generally parallel to said base, said bearing surface being arcuate in transverse cross-section and having a length encompassing at least a major portion of the width of the sector taken along a line including the bearing surface,
   (c) a force transmitting member for each of said sectors comprising a web portion having a width substantially greater than the thickness thereof and having first and second elongate bearing portions extending along opposite ends thereof and being of lengths corresponding at least to the width of said web portion along the corresponding ends thereof, the outer surfaces of said bearing portions defining first and second bearing surfaces arcuate in transverse cross-section and having a radius of curvature at least as great as one-half the thickness of said web portion, said first bearing surface on each of said force transmitting members being disposed in coextensive complementary engagement with the bearing surface on the corresponding sector and defining therewith an axis about which said force transmitting member is oscillatorily movable toward and away from said base, said second bearing surface on said transmitting member being of sufficient relative length to said first bearing surface thereon and said first bearing surface and said bearing surface on the corresponding sector being of sufficient relative length to the chord length of the periphery of the sector that a major portion of the sector is subjected to compressive load to substantially offset the bending loads thereon, and
   (d) force applying means having elongate bearing surfaces arcuate in transverse cross-section and coextensively and complementarily engaging the second bearing surfaces on said force transmitting members for applying force thereto in a direction to move said force transmitting members toward said base and to move said sectors radially outwardly from the retracted position to the expanded position.

7. An expansible mandrel according to claim 6 wherein said complementary bearing surfaces on said sectors, said force transmitting members, and said force applying means are substantially semi-circular in transverse cross-section and have a diameter at least as great as the thickness of said web portions of said force transmitting members.

8. An expansible mandrel according to claim 6 wherein said bearing surfaces on each of said sectors and on said force applying means are concave in transverse cross-section and wherein said first and second bearing surfaces on said force transmitting members are convex in transverse cross-section.

9. An expansible mandrel for use in connection with the manufacture of tubular members, said mandrel comprising
(a) a base,
(b) at least three sectors mounted on said base for sliding radial movement between a retracted position and an expanded position, said sectors having outer peripheries adapted to engage the interior surface of a tubular member when said sectors are in expanded position, each of said sectors having an elongate bearing surface thereon positioned inwardly from the periphery of said sectors and extending generally parallel to said base, said bearing surface being substantially semi-circularly concave in transverse cross-section and having a length encompassing at least a major portion of the width of the sector taken along a line including the bearing surface,
(c) a force transmitting member for each of said sectors comprising a web portion having a width substantially greater than the thickness thereof and first and second elongated rod-like bearing portions extending along opposite ends thereof and being of lengths corresponding at least to the width of said web portion along the corresponding ends thereof, and of a diameter at least as great as the thickness of said web portion, the outer surfaces of said bearing portions defining first and second bearing surfaces, said first bearing surface on each of said force transmitting member being disposed in coextensive complementary engagement with the bearing surface on the corresponding sector and defining therewith an axis about which said force transmitting member is oscillatorily movable toward and away from said base, said second bearing surface on said transmitting member being of sufficient relative length to said first bearing surface thereon and said first bearing surface and said bearing surface on the corresponding sector being of sufficient relative length to the chord length of the periphery of the sector that a major portion of the sector is subjected to compressive load to substantially offset the bending loads thereon, and
(d) force applying means having elongate bearing surfaces substantially semi-circularly concave in transverse cross-section and coextensively and complementarily engaging the second bearing surfaces on said force transmitting members for applying force thereto in a direction to move said sectors radially outwardly from the retracted position to the expanded position.

10. An expansible mandrel for use in connection with the manufacture of tubular members, said mandrel comprising
(a) a flat, substantially circular base,
(b) at least three sectors mounted on said base for sliding radial movement between a retracted position and an expanded position for engagement with the interior surface of a tubular member, each of said sectors having a continuous, uninterrupted elongate, transversely concave bearing surface thereon disposed inwardly from the periphery of the sectors,
(c) a plurality of force transmitting members, one for each of said sectors, and each comprising a widthwise elongate plate-like web portion and first and second rod-like bearing portions mounted on opposite ends of said web portion, said first and second bearing portions being of a diameter at least as great as the thickness of said web portion and the outer surfaces thereof defining first and second bearing surfaces on said force transmitting member, said bearing portions being longer than opposite ends of said web portion and having opposite end portions thereof projecting outwardly from opposite sides of said web portion, said first bearing surface on each of said force transmitting members being disposed within the concave bearing surface on the corresponding sector to mount said force transmitting member for oscillatory movement relative to said base and said sectors, said first bearing surface on each force transmitting member and said bearing surface on said sector being of sufficient length relative to the chord length of the periphery of the sector to subject a major portion of each of said sectors to compressive load which substantially offsets the bending loads thereon,
(d) a hub carried by said base for movement from a first position spaced from the base to a second position wherein the same is closer to said base, said hub having continuous, uninterrupted, elongate, transversely concave bearing surfaces thereon, said second bearing surfaces on said force transmitting members being disposed within the bearing surfaces on said hub, said second bearing surfaces on said force transmitting members and said bearing surfaces on said hub being of sufficient length relative to said first bearing surfaces on said first transmitting members and said bearing surfaces on said sectors that a line drawn between adjacent ends thereof forms an angle of at least 45 degrees relative to said first bearing surfaces,
(e) means carried by said hub and by said sectors and extending at least partially around the projecting end portions of said bearing portions to connect said force transmitting members to said hub and said sectors to maintain said first and second bearing portions in cooperating relation to the bearing surfaces on said hub and said sectors and to connect the sectors to the hub,
(f) means engaging said hub for moving the same toward said base to exert a radial, outward force on said sectors through said force transmitting members to move the sectors from the retracted position to the expanded position, and
(g) spring means disposed between said base and said hub for biasing said hub away from said base toward said first position and for moving said sectors from the expanded position to the retracted position through said force transmitting members.

References Cited by the Examiner
UNITED STATES PATENTS

| | | | |
|---|---|---|---|
| 634,172 | 10/1899 | Johnson | 153—35 |
| 1,567,387 | 12/1925 | Rode | 153—80 XR |
| 1,823,047 | 9/1931 | Hothersall | 153—80 XR |
| 2,090,838 | 8/1937 | Gustafson | 269—52 XR |
| 2,167,896 | 8/1939 | Graham et al. | 113—103 |
| 2,413,103 | 12/1946 | Forbes | 113—103 |
| 2,734,120 | 2/1956 | Sensenig | 113—103 XR |
| 2,804,836 | 9/1957 | Tiedemann | 269—52 XR |
| 2,943,667 | 7/1960 | Ewing et al. | 153—80 |

CHARLES W. LANHAM, *Primary Examiner.*